US008007951B2

(12) United States Patent
Andreas-Schott et al.

(10) Patent No.: US 8,007,951 B2
(45) Date of Patent: Aug. 30, 2011

(54) FUEL CELL COMPRESSION RETENTION SYSTEM USING COMPLIANT STRAPPING

(75) Inventors: Benno Andreas-Schott, Pittsford, NY (US); Anthony Chinnici, Rochester, NY (US); Yeh-Hung Lai, Webster, NY (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1025 days.

(21) Appl. No.: 11/760,219

(22) Filed: Jun. 8, 2007

(65) Prior Publication Data

US 2008/0305380 A1 Dec. 11, 2008

(51) Int. Cl.
*H01M 2/20* (2006.01)
(52) U.S. Cl. ......... 429/470; 429/467; 429/469; 429/452
(58) Field of Classification Search ........................ None
See application file for complete search history.

(56) References Cited

U.S. PATENT DOCUMENTS

| | | | | |
|---|---|---|---|---|
| 5,053,291 A | * | 10/1991 | Hirota | 429/458 |
| 5,484,666 A | | 1/1996 | Gibb et al. | |
| 5,789,091 A | * | 8/1998 | Wozniczka et al. | 429/12 |
| 6,040,072 A | * | 3/2000 | Murphy et al. | 429/12 |
| 2005/0064268 A1 | * | 3/2005 | Cho et al. | 429/37 |
| 2006/0040166 A1 | | 2/2006 | Budinski et al. | |
| 2006/0134508 A1 | * | 6/2006 | Ueda et al. | 429/44 |
| 2006/0188771 A1 | * | 8/2006 | Allen et al. | 429/37 |

OTHER PUBLICATIONS

Definition of sheet metal. (2000). In Collins English Dictionary. Retrieved on Jan. 8, 2011 from http://www.credoreference.com/entry/hcengdict/sheet_metal.*
Yeh-Hung Lai et al., "Stack Compression of PEM Fuel Cells" Proceedings of FUELCELL2004, Second International ASME Conference on Fuel Cell Science Engineering, and Techology, Rockester, N.Y. (2004).

* cited by examiner

*Primary Examiner* — Cynthia Lee
(74) *Attorney, Agent, or Firm* — Fraser Clemens Martin & Miller LLC; J. Douglas Miller

(57) ABSTRACT

A fuel cell system is provided including a fuel cell stack having a first end and second end. The fuel cell stack includes at least one fuel cell having a membrane-electrode assembly disposed between adjacent gas diffusion layers. The fuel cell system further includes a compression retention system having a plurality of compliant straps adapted to apply a compressive force to the fuel cell stack. The plurality of compliant straps are further adapted to accommodate an expansion of the fuel cell stack during an operation thereof and maintain the compressive force within a desired range.

2 Claims, 3 Drawing Sheets

FUEL CELL COMPRESSION RETENTION SYSTEM USING COMPLIANT STRAPPING

FIELD OF THE INVENTION

The present disclosure relates to fuel cell systems and, more particularly, to compression retention systems for fuel cell stacks.

BACKGROUND OF THE INVENTION

Fuel cells have been proposed as a clean, efficient and environmentally responsible power source for electric vehicles and various other applications. One example of a fuel cell is the Proton Exchange Membrane (PEM) fuel cell. The PEM fuel cell includes a membrane-electrode-assembly (MEA) that generally comprises a thin, solid polymer membrane-electrolyte having an electrode including a catalyst on both faces of the membrane-electrolyte.

The MEA generally comprises porous conductive materials, also known as gas diffusion media (GDM), which distribute reactant gases to the anode and cathode electrode layers. Fuel, such as hydrogen gas, is introduced at the anode where it reacts electrochemically in the presence of the catalyst to produce electrons and protons. The electrons are conducted from the anode to the cathode through an electrical circuit disposed therebetween. Simultaneously, the protons pass through the electrolyte to the cathode where an oxidant, such as oxygen or air, reacts electrochemically in the presence of the electrolyte and catalyst to produce oxygen anions. The oxygen anions react with the protons to form water as a reaction product.

The MEA is generally interposed between a pair of electrically conductive contact elements or bipolar plates to complete a single PEM fuel cell. In typical operation, the MEA is known to expand and contract with changes in humidity and temperature. Compression retention systems are typically designed in a manner effective to offset the strains produced by membrane swelling that can occur with membrane expansion and compressive stress relaxation in the fuel cell stack. In conventional fuel cell stacks, for example, the MEA is known to expand by up to about 50% of its original thickness in operation.

Compression retention systems act to minimize an overcompression of the fuel cell stack and are designed to maintain a desired contact pressure between bipolar plates, gas diffusion media, and catalyst layers. A limited amount of compression set of the GDM occurs under typical operational loads of the fuel cell stack. However, when excessive compression loads are applied to the GDM, the force can physically degrade the GDM by fracturing carbon fibers or breaking up binders that bind the carbon fibers together to an undesirable extent. Therefore, it is generally desirable for an appropriate compression load to be maintained and provide a desired electrical resistance, but not to exceed the desired range during operation of the fuel cell stack.

It is stated in U.S. Pat. No. 5,484,666 to Gibb et al. that conventional compression systems have consisted of tie rods extending through and between endplate assemblies and secured with fastening nuts. Springs threaded on the tie rods and interposed between the fastening nuts and the endplates have been used to apply resilient compressive force to fuel cell stacks in the stacking direction. Fuel cell side plates having controlled tensile compliance are also reported in U.S. Pat. Appl. Pub. No. 2006/0040166 to Budinski et al. It is stated in Budinski et al that the compression forces on a fuel cell stack can be controlled by incorporating at least one spring element into a side plate.

In U.S. Pat. No. 5,789,091, Wozniczka et al. further reports a mechanism for securing a fuel cell stack in an assembled and compressed state which includes at least one compression band that circumscribes end unit assemblies and interposed fuel cells in the fuel cell stack. Murphy et al. in U.S. Pat. No. 6,040,072 also reports an apparatus for securing an electrochemical cell stack that includes a banding member.

Assignee's co-pending U.S. patent application Ser. No. 11/638,283, hereby incorporated herein by reference in its entirety, describes a compression retention system including at least one generally planar strap forming at least one bend, the at least one strip extending from a first end to a second end unit of the fuel cell stack. Also, assignee's co-pending U.S. patent application Ser. No. 11/591,377, hereby incorporated herein by reference in its entirety, describes a compression retention system composed of at least one tie rod extending from an upper end unit to a lower end unit. The tie rod is disposed outside of the fuel cell stack and fastened to the end units by brackets secured to the end units. A spring is interposed between at least one of the fastener and the end units.

There is a continuing need for a compression retention system for electrochemical fuel cells that optimizes a mass, volume and thermal efficiency of the fuel cell system, provides substantially uniform compression during fuel cell stack operation and with a variety of stack sizes, and militates against a degradation of the gas diffusion media in the fuel cell stack.

SUMMARY OF THE INVENTION

In concordance with the instant disclosure, a compression retention system that is compliant, provides substantially uniform compression during fuel cell stack operation and with a variety of stack sizes, optimizes volumetric and thermal efficiency, and militates against a degradation of the gas diffusion media in the fuel cell stack is surprisingly discovered.

In one embodiment, a fuel cell system is provided including a fuel cell stack having a first end and second end. The fuel cell stack includes at least one fuel cell having a membrane-electrode assembly disposed between two of a plurality of gas diffusion layers. The fuel cell system further includes a compression retention system having a plurality of compliant straps adapted to apply a compressive force to the fuel cell stack. The plurality of compliant straps are further adapted to accommodate an expansion of the fuel cell stack during an operation thereof and maintain the compressive force within a desired load range.

In another embodiment, the fuel cell system includes a first end unit disposed adjacent the first end of the fuel cell stack and a second end unit disposed adjacent the second end of the fuel cell stack. A first sheet metal layer is disposed adjacent the first end unit and a second sheet metal layer is disposed adjacent the second end unit. The first and second sheet metal layers are coupled to the plurality of compliant straps.

In a further embodiment, the plurality of compliant straps circumscribes the fuel cell stack.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
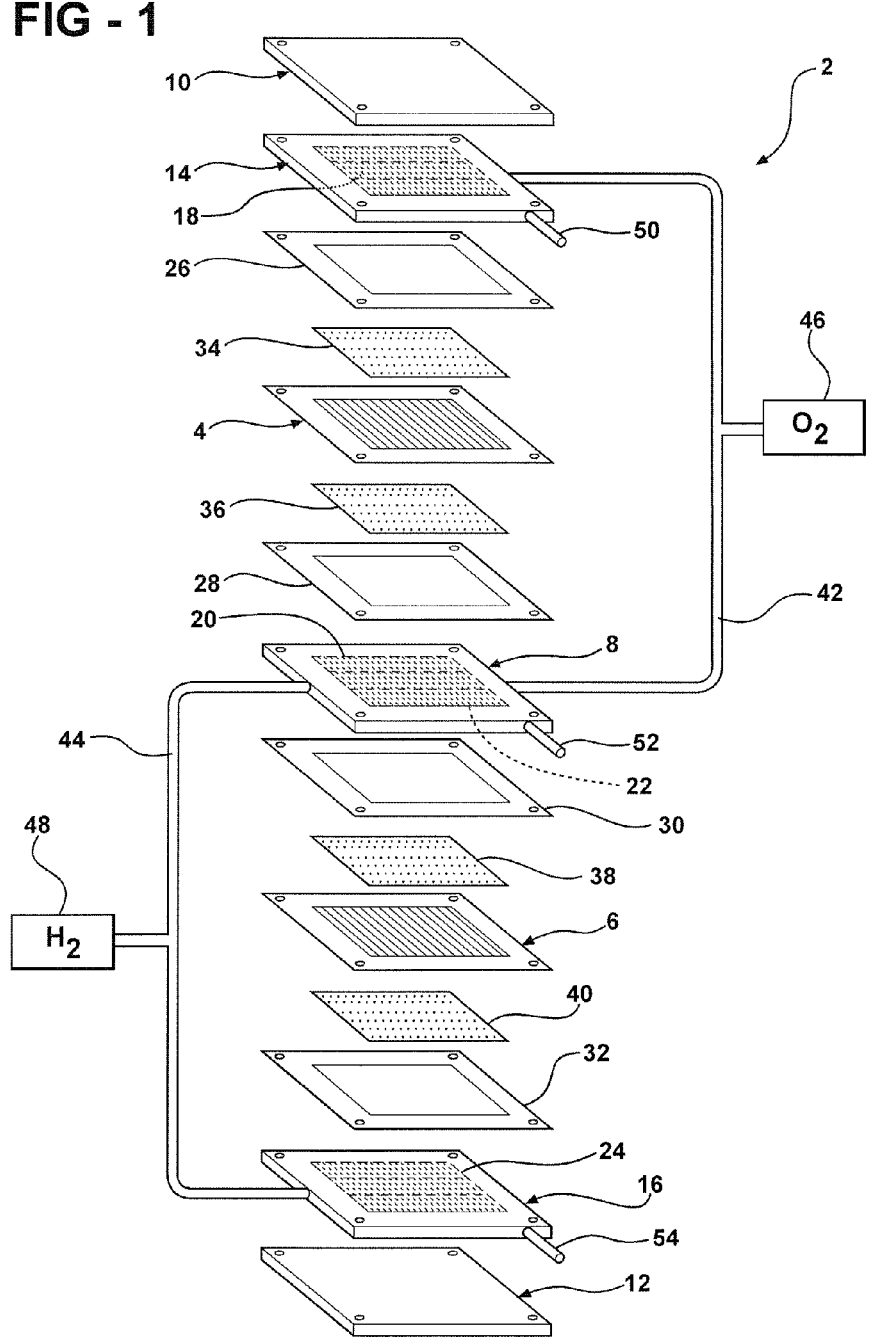
FIG. 1 illustrates a schematic, exploded perspective view of a PEM fuel cell stack (showing only two cells)

The following description is merely exemplary in nature and is not intended to limit the present disclosure, application, or uses. It should also be understood that throughout the drawings, corresponding reference numerals indicate like or corresponding parts and features. For simplicity, only a two-cell stack (i.e. one bipolar plate) is illustrated and described in FIG. 1, it being understood that a typical stack will have many more such cells and bipolar plates.

FIG. 1 depicts a two cell PEM fuel cell stack 2 having a pair of membrane-electrode-assemblies (MEAs) 4, 6 separated from each other by an electrically conductive fluid distribution element 8, hereinafter bipolar plate 8. The MEAs 4, 6 and bipolar plate 8, are stacked together between end units 10, 12, and end contact elements 14, 16. The end contact elements 14, 16, as well as both working faces of the bipolar plate 8, include a plurality of flowpath grooves or channels 18, 20, 22, 24, respectively, for distributing fuel and oxidant gases (e.g., $H_2$ and $O_2$) to the MEAs 4, 6. Nonconductive gaskets 26, 28, 30, 32 provide seals and electrical insulation between the several components of the fuel cell stack.

The MEAs 4, 6 are disposed adjacent gas permeable conductive materials known as gas diffusion media (GDM) 34, 36, 38, 40. The GDM 34, 36, 38, 40 may include carbon or graphite diffusion paper. Suitable carbon paper is commercially available from Toray Industries as Toray TGP-H060, for example. The GDM 34, 36, 38, 40 contact the MEAs 4, 6. The end contact units 14, 16 contacts the GDM 34, 40 respectively. The bipolar plate 8 contacts the GDM 36 on the anode face of MEA 4, configured to accept hydrogen-bearing reactant, and also contacts GDM 38 on the cathode face of MEA 6, configured to accept oxygen-bearing reactant. Oxygen is supplied to the cathode side of the fuel cell stack 2 from storage tank 46, for example, via an appropriate supply conduit 42. Hydrogen is supplied to the anode side of the fuel cell from a storage tank 48, for example, via an appropriate supply conduit 44. Alternatively, ambient air may be supplied to the cathode side as an oxygen source and hydrogen to the anode from a methanol or gasoline reformer, and the like. Exhaust conduits (not shown in FIG. 1) for both the anode and cathode sides of the MEAs 4, 6 are also provided. Additional conduits 50, 52, and 54 are provided for supplying liquid coolant to the bipolar plate 8 and end units 14, 16. Appropriate conduits for exhausting coolant from the bipolar plate 8 and end units 14, 16 are also provided (not shown).

Figure 2:
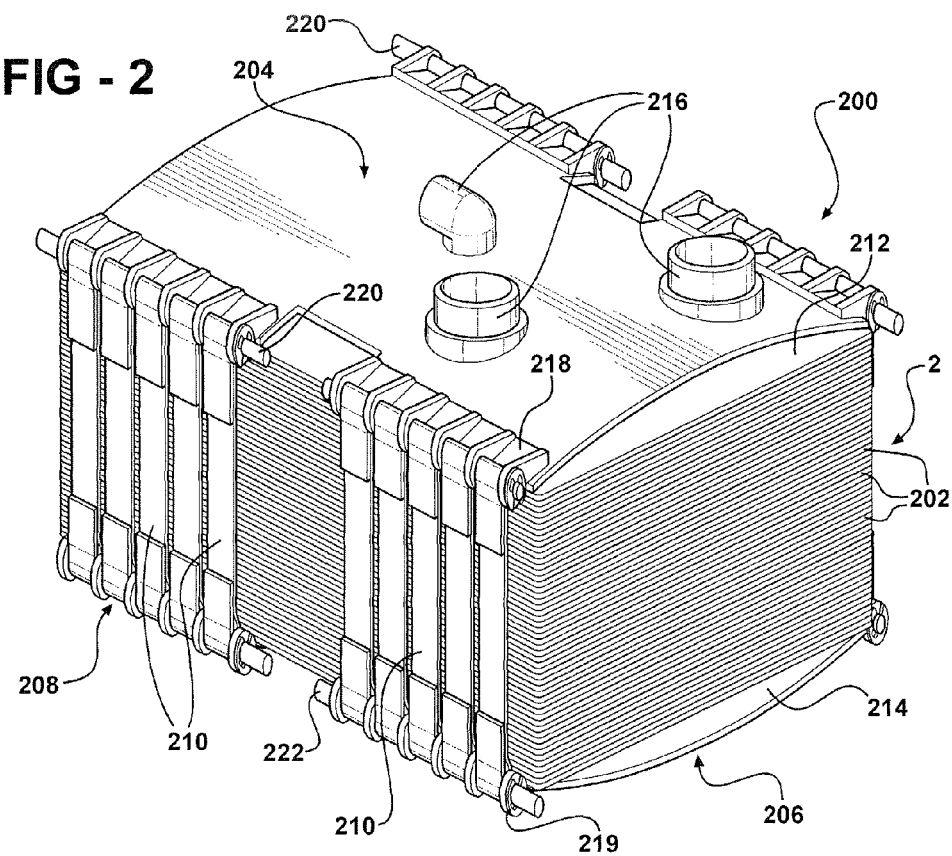
FIG. 2 is a perspective view of a fuel cell system having a compression retention system according to an embodiment of the invention.

Referring next to FIG. 2, a fuel cell system 200 according to the present disclosure is shown. The fuel cell system 200 has the fuel cell stack 2 having a plurality of individual fuel cells 202. The fuel cell stack 2 has a first end 204 and a second end 206. The fuel cell system 200 includes a compression retention system 208 having a plurality of compliant straps 210 disposed adjacent the fuel cell stack 2. The compression retention system 208 is adapted to apply a compressive force to the fuel cell stack and to accommodate an expansion of the fuel cell stack 2. The compression retention system 208 is further adapted to maintain the compressive force within a desired range. It should be appreciated that the expansion of the fuel cell stack 2 results from the swelling or expansion of a plurality of MEAs (not shown) that occur with changes in humidity and temperature of the fuel cell stack 2 while in operation. For example, the expansion of the fuel cell stack 2 occurs as the temperature of the fuel cell stack 2 rises from about an ambient temperature of 25° C. to an operating temperature of about 80° C.

In one embodiment, the fuel cell system 200 includes a first end unit 212 disposed adjacent the first end 204 and a second end unit 214 disposed adjacent the second end 206. The first and second end units 212, 214 may house, for example, fuel cell subsystems and related devices 216 involved in preconditioning and operation of the fuel cell stack 2. As nonlimiting examples, the fuel cell subsystems housed within the first and second end units 212, 214 include fluid passages, hydrogen fuel and oxidant ($O_2$/air) passages, cooling pumps, recirculation pumps, drainage valves, insulation, fans, compressors, valves, electrical connections, reformers, humidifiers, and related instrumentation. It should be recognized that additional fuel cell subsystems and related devices 216 used in support of the fuel cell system 200 may be housed in the first and second end units 212, 214 as desired.

In another embodiment, the plurality of compliant straps 210 circumscribe the fuel cell stack 2. For example, the plurality of compliant straps 210 is formed from a continuous band wrapped around both the first and second end units 204, 206 of the fuel cell stack 2. In certain embodiments, a skilled artisan should understand that the plurality of compliant straps 210 composed of the continuous band will halve a stress on the straps 210 and double the spring rate, for example.

In a particular embodiment of the present disclosure, the plurality of compliant straps 210 is disposed between the first end unit 212 and the second end unit 214. As a nonlimiting example, the plurality of compliant straps 210 is coupled to the first end unit 212 and the second end unit 214 by a respective fastener 218, 219. The fasteners 218, 219 are disposed at opposite ends of each of the straps 210, for example. Various fasteners 218, 219 can be used as desired. Nonlimiting examples of suitable fasteners 218, 219 include brackets, clamps, clips, adhesive, fastening bolts and nuts, welds, screws, combinations thereof, and the like. In one embodiment, the fastener 218 includes one or more brackets coupled to at least one of the first and second end units 212, 214.

In a further embodiment, the compression retention system 208 includes a first rigid member 220 coupled to the first end unit 212 and a second rigid member 222 coupled to the second end unit 214. The rigid members 220, 222 are respectively coupled to the first and second end units 212, 214 via the fasteners 218, 219, for example. It should be appreciated that the compression retention system typically will include more than one first and second rigid members 220, 222. For example, in the embodiment shown, at least two first rigid members 220 and at least two second rigid members 220 are disposed on opposing sides of the first and second end units 212, 214, respectively.

The first and second rigid members 218, 220 are adapted to distribute the compressive force along a length of the first and second end units 212, 214. As a nonlimiting example, the compressive force is substantially uniformly distributed along the length of the first and second end units 212, 214. In one embodiment, the first and second rigid members 220, 222 are metal shafts and the fasteners 218, 219 are metal brackets affixed to the first and second end units 212, 214. Alternative means for distributing the compressive force may be used as desired.

Illustratively, the plurality of compliant straps 210 is coupled to the first and second rigid member 220, 222. For example, the compliant straps 210 wrap around at least one of the first and second rigid members 220, 222 to form a plurality of loops 223. The plurality of compliant straps 210 is thereby coupled to the rigid members 220, 222. It should be appreciated that the loops may be held together by an adhesive or welded, for example. In a particular example, the loops 223 of the compliant strap 210 are vibration welded. In a further embodiment, the compliant straps 210 form a continuous ring wrapped around both the first and second rigid members 220 and having a single joined region. Alternative means may be employed to couple the plurality of compliant straps 210 to the first and second rigid members 220, 222.

Figure 3:
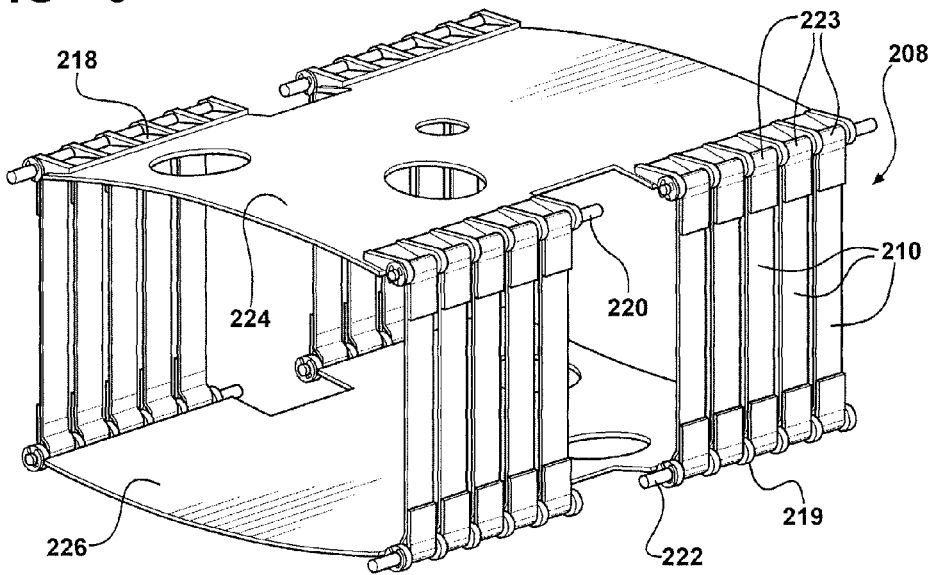
FIG. 3 is a perspective view of an a compression retention system according to an embodiment of the invention.

With reference to FIG. 3, the compression retention system 208 of the present disclosure includes a first sheet 224 disposed adjacent the first end unit 212 and a second sheet 226 disposed adjacent the second end unit 214. As a nonlimiting example, the first and second sheets 224, 226 are stretched tightly over the first and second ends units 212, 214 of the fuel cell stack 2. In particular embodiments, the first and second sheets 224, 226 are produced from metal and extend between and are coupled to the fasteners 218, 219, respectively. Examples of suitable sheet metals include aluminum, brass, copper, steel, tin, nickel, titanium, and alloys thereof. In other embodiments, steel sheet metal is stretched over the first and second ends 204, 206 after formation of the unit, e.g. via molding. It is understood that sheet metal of various thicknesses can be used as desired. It is also understood that other conventional materials can be used to form the first and second sheets 224, 226, as desired.

Employed in conjunction with the first and second sheets 224, 226, the end units 212, 214 have a curvature sufficient to transform the bending load of the sheets 224, 226 into a substantially uniform compressive stress across the fuel cell stack 2 when the compressive force is applied by the compression retention system 208. As a nonlimiting example, the curvature of the end units 212, 214 may be defined by a single radius, for instance the end units 212, 214 forming a half sphere. The overall curvature of the end units 212, 214 can also be defined by one or more radii. It should be appreciated that the radii are dependant upon the width and thickness of the end units 212, 214, as well as the overall height available for the fuel cell system 200, and can be selected as desired. The curvature may also have further intermediate or transitional radii and may comprise surfaces not characterizable by radii, e.g. intermittent and continuous sloping surfaces.

In one particular embodiment, the plurality of compliant straps 210 is under tension. Being under tension, it should be understood that the straps 210 apply the compressive force to the fuel cell stack 2. The compressive force urges the plurality of fuel cells 202 toward one another and facilitates electrical contact therebetween. The application of compressive force to the fuel cell stack 2 generally reduces electrical contact resistance between the plurality of fuel cells 202 and improves the overall electrical efficiency of the fuel cell stack 2.

As a nonlimiting example, the compliant straps 210 are placed in tension by first attaching the compliant straps 210 to the first sheet 224. The compliant straps 210 are then temporarily attached at an opposite end of the straps 210 to an immovable fixture (not shown), for example a floor fixture, and a compressive load is placed on the fuel cell stack 2. The compressive load applied to the fuel cell stack 2 simultaneously compresses the fuel cells 202 and places the compliant straps 210 in tension. The compliant straps 210 are then affixed to the second sheet 226 before being detached from the immovable fixture, thus providing a compressive force on the fuel cell stack 2.

In another embodiment, the compliant straps 210 are placed in tension by temporarily compressing the fuel cell stack 2 or loading the stack 2 to a compression higher than desired for the assembled fuel cell system 200, attaching the plurality of straps 210 to the fuel cell stack 2 at both the first sheet 224 and the second sheet 226 with the fasteners 212, and then removing the load and allowing the compressed stack 2 to decompress slightly, thereby placing the compliant straps 210 in tension. The compression retention system 208 comprising the compliant straps 210 in tension thereby maintains a compressive force on the fuel cell stack 2.

Each of the plurality of compliant straps 210 typically has a surface that is substantially planar. For example, the compliant straps 210 have a substantially flat surface and an average thickness from about 1 mm to about 10 mm, an average length of about 200 mm to about 1100 mm, and an average width from about 10 mm to about 60 mm, although straps 210 having different dimensions can be used as desired. In one embodiment, the average thickness of the planar strap 210 is about 1.3 mm, the average length is about 500 mm, and the average width is about 19 mm. It should be understood that the size and type of fuel cell stack 2, as well as the compressive load desired, dictate the overall dimensions of the planar straps 210 of the present disclosure, and that other dimensions may also be used.

The plurality of compliant straps 210 is formed from a material having an elasticity sufficient to be employed in the compression retention system 208 without a separate spring package, such as coiled springs and the like. In particular embodiments, the compliant straps 210 are formed from at least one of a polymeric material and a woven material. The polymeric material includes a high strength plastic such as polyester, for example. The woven material may be metallic, fibrous, and combination thereof. In one embodiment, the compliant straps 210 are formed from a woven polyester material. A skilled artisan should understand that other compliant materials may be used as desired.

It should be appreciated that the plurality of compliant straps 210 is further adapted to accommodate an expansion of the fuel cell stack 2 during an operation thereof and maintain the compressive force within a desired range. As a nonlimiting example, the desired range is a range wherein a physical degradation of the gas diffusion layers beyond the compression set typically experienced with the compressive force used to achieve a desirable contact resistance is not substantial. In one embodiment, the desired range is less than about 10% greater than a load on the fuel cell stack without expansion, e.g. the load on the fuel cell stack 2 after initial compression (including, for example a relaxation period as is known in the art). For example, in a fuel cell stack having a desired stack compression of about 83,000N, the load on the fuel cell stack 2 undergoing expansion does not exceed about 92,000N with the compression retention system 208 of the disclosure. In a further embodiment, the desired range is less than about 7.5% greater than the load on the fuel cell stack 2 without expansion. In another embodiment, the desired range is less than about 5% greater than the load on the fuel cell stack 2 without expansion.

In a particular embodiment, each of the plurality of compliant straps 210 has a load deflection curve that is substantially linear. For example, the plurality of compliant straps 210 exhibits a load deflection curve that provides a substantially constant increase in deflection with a corresponding increase in a tensile load applied to the plurality of compliant straps, such as during the expansion of the fuel cell stack 2. It should be understood that the load deflection curve of the plurality of compliant straps 210 may not be linear beyond a load greater than the desired range within which the compressive force is maintained. It should be further appreciated that suitable load deflection curves may be selected as desired, for example, by choosing a particular material and dimensions for the plurality of compliant straps 210.

In one particular embodiment, a stiffness of the plurality of compliant straps 210 is lower than a stiffness of the plurality of GDM in the fuel cell stack 2. It should be appreciated that this allows the compression retention system 208 to accommodate the expansion in a height of the fuel cell stack 2. Thus, a physical degradation of the plurality of GDM is minimized. As a nonlimiting example, the plurality of compliant straps 210 is adapted to accommodate up to about 12 mm of expansion in the stack height. In one example, the plurality of compliant straps 210 is adapted to accommodate up to about 6 mm of expansion. In another example, the plurality of compliant straps 210 is adapted to accommodate up to about 3 mm of expansion. In a further example, the plurality of compliant straps 210 is adapted to accommodate up to about 30 μm per fuel cell in the fuel cell stack 2. A skilled artisan should appreciate that other amounts of deflection within the compression retention system 208 may be selected as desired.

It is surprisingly found that the compression retention system 208 of the present disclosure provides a means for maintaining the compressive force on the fuel cell stack 2 without the use of a distinct spring package or metal side plates and push plates as is typically found at a dry end of the fuel cell stacks of the art. The compression retention system 208 optimizes a mass and volume of the fuel cell system 200. Consequently, a thermal mass of the fuel cell system 200 is also optimized. It should be further understood that the compression retention system 208 further provides substantially the same spring rate as conventional systems employing spring packages, thereby militating against an excessive degradation of the plurality of GDM in the fuel cell stack 2.

Example

Figure 4:
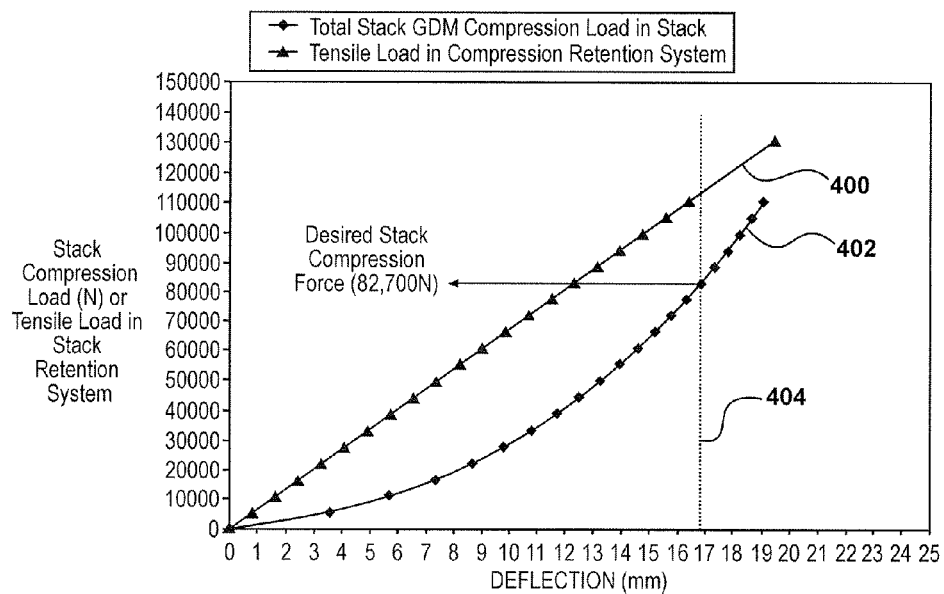
FIG. 4 is a graph showing a load deflection curve of a stack GDM relative to a load deflection curve of a compression retention system according to an embodiment of the invention.
Figure 5:
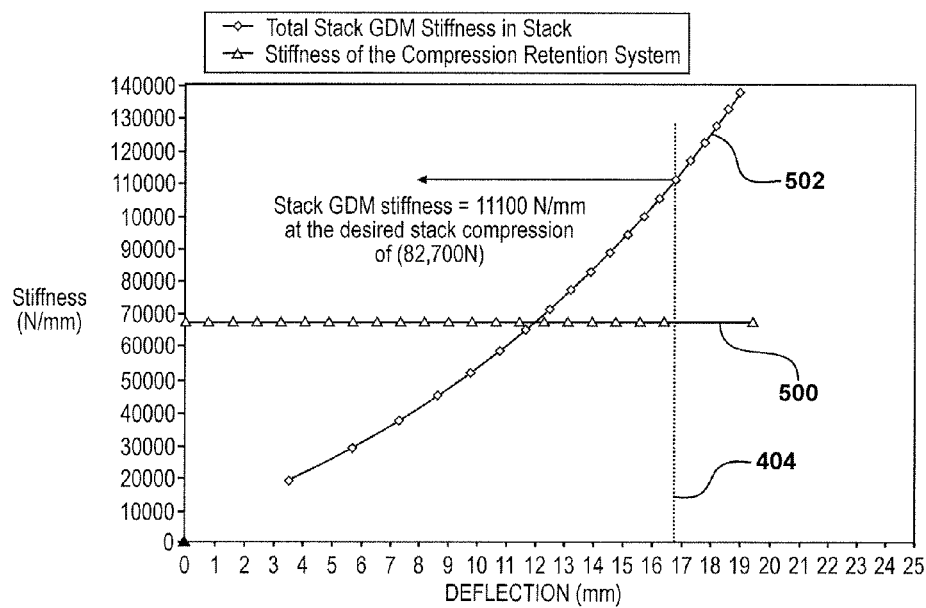
FIG. 5 is a graph showing a stiffness curve of a stack GDM relative to a stiffness curve of a compression retention system according to an embodiment of the invention.

An illustrative fuel cell stack having a compression retention system according to the disclosure is depicted in FIGS. 4 and 5. The fuel cell stack includes 200 cells and provides a power of about 72 kW (about 0.6V at 1.5 A/cm$^2$). The fuel cell stack has an active area size of about 400 cm$^2$. The GDM employed in the fuel cell stack includes 400 sheets of Toray TGP-H060 carbon paper having a thickness of about 0.180 mm per sheet. At a desired compression force of about 83,000 N, providing a GDM compression pressure of 2.1 Mpa, the total height of the fuel cell stack is about 500 mm.

The compression retention system includes 40 compliant polyester straps having a thickness of about 1.3 mm, a width of about 19 mm, and a length of about 500 mm per strap. Each of the compliant straps has an elastic modulus of about 3400 Mpa. Therefore, each of the compliant straps has a stiffness of about 168 N/mm and the compression retention system has a total stiffness of about 6720 N/mm.

As shown in FIG. 4, a plurality of compliant straps of the compression retention system has a load deflection curve 400 that is substantially linear during the expansion of the fuel cell stack 2 while in operation. The GDM of the fuel cell stack has a GDM load deflection curve 402 that is not substantially linear. At the desired stack compression force 404, it is observed that the GDM stiffness is therefore about 11,100 N/mm.

A comparison of the relative stiffness (N/mm) 500, 502 of the compression retention system and the GDM of the fuel cell stack is further depicted in FIG. 5. It should be appreciated that the stiffness 500 of the compression retention system at the desired stack compression force 404 is about 6700 N/mm. Thus, the stiffness 500 of the compression retention system is about 60% lower than the stiffness 502 of the GDM 502 at the desired stack compression force. The compression retention system therefore is able to absorb a desired quantity of the dimensional changes that occur with expansion of the fuel cell stack height in operation, without resulting in a substantial increase in the compression force.

While certain representative embodiments and details have been shown for purposes of illustrating the invention, it will be apparent to those skilled in the art that various changes may be made without departing from the scope of the invention, which is further described in the following appended claims.

What is claimed is:

1. A fuel cell system comprising:
a fuel cell stack having a first end and second end, the stack comprising at least one fuel cell having a membrane-electrode assembly disposed between two of a plurality of gas diffusion layers;
a first end unit disposed adjacent the first end of the fuel cell stack;
a second end unit disposed adjacent the second end of the fuel cell stack;
a first sheet metal layer disposed adjacent the first end unit;
a second sheet metal layer disposed adjacent the second end unit; and
a compression retention system including a plurality of compliant straps adapted to apply a compressive force to the fuel cell stack, the plurality of compliant straps further adapted to accommodate an expansion of the fuel cell stack during an operation thereof and maintain the compressive force within a desired range; wherein the plurality of compliant straps is coupled to the first sheet metal layer and the second sheet metal layer, wherein the plurality of compliant straps is coupled to the first metal sheet layer and the second metal sheet layer with a fastener,
wherein the compression retention system further includes a first rigid member disposed on the first end unit and coupled to the first metal sheet layer, and a second rigid member disposed on the second end unit and coupled to the second metal sheet layer, the plurality of compliant straps extending from the first rigid member to the second rigid member, wherein the first and second rigid members distribute the compressive force along a length of the fuel cell stack,
wherein the first and second rigid members are metal shafts oriented along the length of the fuel cell stack, and the fasteners are elongate metal brackets affixed to the first and second metal sheet layers, and
wherein the metal shafts are disposed through a plurality of holes formed in the elongate metal brackets, and individual ones of the compliant straps are coupled to the metal shafts between pairs of the holes formed in the elongate metal brackets.

2. A fuel cell system comprising:

a fuel cell stack having a first end and second end, the stack comprising at least one fuel cell having a membrane-electrode assembly disposed between two of a plurality of gas diffusion layers;

a first end unit disposed adjacent the first end of the fuel cell stack;

a second end unit disposed adjacent the second end of the fuel cell stack, wherein at least one of the first end unit and the second end unit includes a fuel cell subsystem involved in at least one of a preconditioning and an operation of the fuel cell stack;

a first sheet metal layer disposed adjacent the first end unit;

a second sheet metal layer disposed adjacent the second end unit; and a compression retention system including a plurality of compliant straps adapted to apply a compressive force to the fuel cell stack, the plurality of compliant straps further adapted to accommodate an expansion of the fuel cell stack during an operation thereof and maintain the compressive force within a desired range, wherein the plurality of compliant straps is coupled to the first sheet metal layer and the second sheet metal layer with a fastener, wherein the compression retention system further includes a first rigid member disposed on the first end unit and coupled to the first metal sheet layer, and a second rigid member disposed on the second end unit and coupled to the second metal sheet layer, the plurality of compliant straps extending from the first rigid member to the second rigid member, wherein the first and second rigid members distribute the compressive force along a length of the fuel cell stack, wherein the first and second rigid members are metal shafts oriented along the length of the fuel cell stack, and the fasteners are elongate metal brackets affixed to the first and second metal sheet layers, and wherein the metal shafts are disposed through a plurality of holes formed in the elongate metal brackets, and individual ones of the compliant straps are coupled to the metal shafts between pairs of the holes formed in the elongate metal brackets.

\* \* \* \* \*